(12) United States Patent
Dai et al.

(10) Patent No.: US 11,164,066 B1
(45) Date of Patent: Nov. 2, 2021

(54) GENERATING PARAMETER VALUES FOR RECURRENT NEURAL NETWORKS

(71) Applicant: Google LLC, Mountain View, CA (US)

(72) Inventors: Andrew M. Dai, San Francisco, CA (US); Quoc V. Le, Sunnyvale, CA (US); David Ha, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1059 days.

(21) Appl. No.: 15/716,330

(22) Filed: Sep. 26, 2017

(51) Int. Cl.
*G06N 3/04* (2006.01)
*G06N 3/08* (2006.01)

(52) U.S. Cl.
CPC ........ *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

| 10,181,098 | B2 * | 1/2019 | Vinyals ................. G06N 3/0445 |
| 2017/0150235 | A1 * | 5/2017 | Mei ......................... G06F 40/253 |
| 2018/0268285 | A1 * | 9/2018 | Dasgupta ............... G06N 3/084 |
| 2018/0276691 | A1 * | 9/2018 | Li ............................ G06Q 30/0202 |
| 2018/0349788 | A1 * | 12/2018 | Sarkar ..................... G06N 3/08 |

OTHER PUBLICATIONS

Ba et al., "Layer Normalization," (Jul. 21, 2016) [online] (retrieved from https://www.cs.toronto.edu/~hinton/absps/LayerNormalization.pdf, 14 pages.
Cooijmans et al., "Recurrent Batch Normalization," (Feb. 28, 2017) [online] (retrieved from https://arxiv.org/pdf/1603.09025.pdf), 13 pages.
Graves, "Generating Sequences with Recurrent Neural Networks," (Jun. 5, 2014) [online] (retrieved from https://arxiv.org/pdf/1308.0850.pdf), 43 pages.
Abadi et al. "Tensorflow: Large-scale machine learning on heterogeneous distributed systems," arXiv1603.04467, Mar. 16, 2016, 19 pages.
Andrychowicz et al. "Learning to learn by gradient descent by gradient descent," arXiv preprint arXiv 1606.04474, Nov. 30, 2016, 17 pages.

(Continued)

*Primary Examiner* — Alexey Shmatov
*Assistant Examiner* — Tri T Nguyen
(74) *Attorney, Agent, or Firm* — Fish & Richardson P.C.

(57) ABSTRACT

Methods, systems, and apparatus, including computer programs encoded on computer storage media, for processing inputs using recurrent neural networks. One of the systems includes a main recurrent neural network comprising one or more recurrent neural network layers and a respective hyper recurrent neural network corresponding to each of the one or more recurrent neural network layers, wherein each hyper recurrent neural network is configured to, at each of a plurality of time steps: process the layer input at the time step to the corresponding recurrent neural network layer, the current layer hidden state of the corresponding recurrent neural network layer, and a current hypernetwork hidden state of the hyper recurrent neural network to generate an updated hypernetwork hidden state.

20 Claims, 7 Drawing Sheets

(56) References Cited

OTHER PUBLICATIONS

Ba et al. "Layer normalization," arXiv preprint arXiv1607.06450, Jul. 21, 2016, 14 pages.
Bishop et al. "Mixture density networks," Neural Computing Research Group, Technical report, 1994, 26 pages.
Chung et al. "Gated feedback recurrent neural networks," arXiv preprint arXiv 1502.02367, Feb. 12, 2015, 11 pages.
Chung et al. "Hierarchical multiscale recurrent neural networks," arXiv preprint arXiv 1609.01704, Dec. 14, 2016, 13 pages.
Clevert et al. "Fast and accurate deep network learning by exponential linear units (ELYs)" arXiv preprint arXiv 1511.07289, Dec. 3, 2015, 14 pages.
Cooijmans et al. "Recurrent Batch Normalization," arXiv 1603.09025, Apr. 12, 2016, 10 pages.
De Bradbandere et al. "Dynamic filter networks," Neural Information Processing Systems, May 31, 2016, 9 pages.
Denil et al. "Predicting Parameters in Deep Learning," Neural Information Processing Systems 2013, 9 pages.
Fernando et al. "Convolution by evolution: Differentiable pattern producing networks," Proceedings of the 2016 on Genetic and Evolutionary Computation Conference, ACM, Jul. 20, 2016, 8 pages.
Gomez et al. "Evolving modular fast-weight networks for control," Artificial Neural Netwroks: Formal Models and Their Applications—ICANN, 2005, 7 pages.
Graves. "Generating sequences with recurrent neural networks," arXiv 1308.0850, Aug. 11, 2013, 43 pages.
He et al. "Deep residual learning for image recognition," Proceedings of the IEEE conference on computer vision and patter recognition, 2016, 9 pages.
He et al. "Identity mapping in deep residual networks," arXiv preprint arXiv 1603.05027, Apr. 12, 2016, 15 pages.
Henaff et al. "Orthogonal RNNs and long-memory tasks," arXiv preprint arXiv 1602.06662, Feb. 22, 2016, 9 pages.
Hinton et al. "Improving neural networks by preventing co-adaption of feature detectors," arXiv preprint arXiv 1207.0580, Jul. 3, 2012, 18 pages.
Hochreiter et al. "Long short-term memory," Neural Computation, 9.8 Nov. 15, 1997, 46 pages.
Huang et al. "Densely connected convolutional networks," arXiv preprint arXiv 1608.06993, Dec. 3, 2016, 11 pages.
Huang et al. "Deep networks with stochastic depth," arXiv preprint arXiv 1603.09382, Jul. 28, 2016, 16 pages.
'prize.hutterl.nee' [online] "Prize for Compressing Human Knowledge," Hutter. Jul. 2016, [retrieved on Sep. 27, 2017] Retrieved from Internet: URL< http://prize.hutterl.net/22 3 pages.
Jaderberg et al. "Decoupled Neural Interfaces using Synthetic Gradients," arXiv preprint arXiv 1608.05343, Aug 18, 2016, 16 pages.
Kalchbrenner et al. "Grid long short-term memory," arXiv preprint arXiv 1507.01526, Jan. 7, 2016, 15 pages.
Kingma et al. "Adam: A method for stochastic optimization," arXiv 1412.6980 Jul. 23, 2015, 15 pages.
Koutnik et al. "Evolving neural networks in compressed weight space," Proceedings of the $12^{th}$ annual conference on Genetic and evolutionary computation, ACM, Jul. 7, 2010, 7 pages.
Krueger et al. "Zoneout: Regularizing RNNs by randomly preserving hidden activations," arXiv preprint arXiv 1606.01305, Jun. 13, 2016, 10 pages.
LeCun et al. "Handwritten digit recognition with a back-propagation network," Advances in Neural Information Processing Systems, 1990, 9 pages.
Lee et al. "Deeply-supervised nets," Artificial Intelligence and Statistics, vol. 2, Feb. 21, 2015, 9 pages.
Lin et al. "Network in network," arXiv 1312.4400 Mar. 4, 2014, 10 pages.
Liwicki et al. "Iam-OnDB—an on-line English sentence database acquired from handwritten text on a whiteboard," IEEE $8^{th}$ International Conference on Document Analysis and Recognition, Aug. 1, 2005, 6 pages.
Marcus et al. "Building a large annotated corpus of English: The penn treebank," Computational linguistics, 19(2), Jun. 1, 1993, 25 pages.
Mikolov et al. "Subword language modeling with neural networks," preprint, 2012, 4 pages.
Moczulski et al. "ACDC: A Structured Efficient Linear Layer," arXiv preprint arXiv 1511.05946, Nov. 18, 2015, 11 pages.
Ognawala et al. "Regularizing recurrent networks-on injected noise and norm-based methods," arXiv preprint arXiv 1410.5684, Oct. 21, 2014, 14 pages.
Rocki. "Recurrent memory array structures," arXiv preprint arXiv 1607.03085, Jul. 11, 2016, 21 pages.
Rocki. "Surprisal-driven feedback in recurrent networks," arXiv preprint arXiv: 1608.06027, Sep. 2, 2016, 8 pages.
Romero et al. "Fitnets: Hints for thin deep nets," arXiv preprint arXiv 1412.6550, Dec. 19, 2014, 12 pages.
Schmidhuber. "Learning to control fast-weight memories: An alternative to dynamic recurrent networks," Neural Computation, 4(1): 1992, 6 pages.
Schmidhuber. "A 'self-referential' weight matrix," Proceedings of the International Conference on Artificial Neural Networks, Sep. 24, 1993, 5 pages.
Semeniuta et al. "Recurrent dropout without memory loss," arXiv 1603.05118, Aug. 5, 2016, 11 pages.
Srivastava et al. "Training very deep networks," Advances in neural information processing systems, 2015, 9 pages.
Stanley et al. "A hypercube-based encoding for evolving large-scale neural networks," Artificial Life, 15(2), Mar. 5, 2009, 39 pages.
Sutskever et al. "Generating text with recurrent neural networks," Proceedings of the $28^{th}$ International Conference on Machine Learning, 2011, 8 pages.
Wu et al. "Google's Neural Machine Translation System: Bridging the Gap between Human and Machine Translation," arXiv 1609.08144, Sep. 26, 2016, 23 pages.
Wu et al. "On multiplicative integration with recurrent neural networks," Advances in Neural Information Processing Systems, 2016, 9 pages.
Xia et al. "Fast algorithms for hierarchically semiseparable matrices," Numerical Linear Algebra with Applications,17(6), Dec. 1, 2010, 24 pages.
Yang et al. "Deep Fried Convnets," Proceedings of the IEEE International Conference on Computer Vision, 2015, 8 pages.
Zagoruyko et al. "Wide residual networks," arXiv preprint arXiv 1605.07146, May 23, 2016, 13 pages.
Zhang et al. "Residual networks of residual networks: Multilevel residual networks," arXiv preprint arXiv: 1608.02908, Aug. 9, 2016, 10 pages.
Zhou et al. "Deep recurrent models with fast-forward connections for neural machine translation," ArXiv 1606.04199, Jul. 23, 2016, 13 pages.
Zilly et al. "Recurrent highway networks," arXiv preprint arXiv 1607.03474, Oct. 27, 2016, 13 pages.

\* cited by examiner

GENERATING PARAMETER VALUES FOR RECURRENT NEURAL NETWORKS

BACKGROUND

This specification relates to recurrent neural networks (RNNs).

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in methods of processing a sequence of network inputs having a respective network input at each of a plurality of time steps to generate a sequence of network outputs that includes the actions of, for each of the plurality of time steps: for each of one or more recurrent neural network layers of a main recurrent neural network: providing a layer input for the recurrent neural network layer at the time step as input to a hyper recurrent neural network corresponding to the recurrent neural network layer, wherein the hyper recurrent neural network is configured to: process the layer input at the time step to the corresponding recurrent neural network layer, the current layer hidden state of the corresponding recurrent neural network layer, and a current hypernetwork hidden state of the hyper recurrent neural network to generate an updated hypernetwork hidden state; determining, from the updated hypernetwork hidden state for the corresponding hyper recurrent neural network, updated values for a set of layer parameters for the recurrent neural network layer; and providing the layer input as input to the recurrent neural network layer, wherein the recurrent neural network layer is configured to process the layer input and a current layer hidden state in accordance with the updated values of the set of layer parameters to generate an updated layer hidden state.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. RNN layers can be trained to more accurately perform tasks that require sequence modeling, such as character-level language modelling, handwriting generation, and neural machine translation, because parameters of RNN layers are modified during processing of a sequence. Accuracy of RNNs can be increased by increasing depth of such neural networks. Additionally, because parameters of the RNN layers can be modified during the processing of the sequence, the RNN can have fewer parameters and still achieve results that meet or exceed the quality of a conventional RNN that has more parameters. Thus, this would reduce the computational footprint of the RNN, i.e., storage and memory requirements for storing the model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
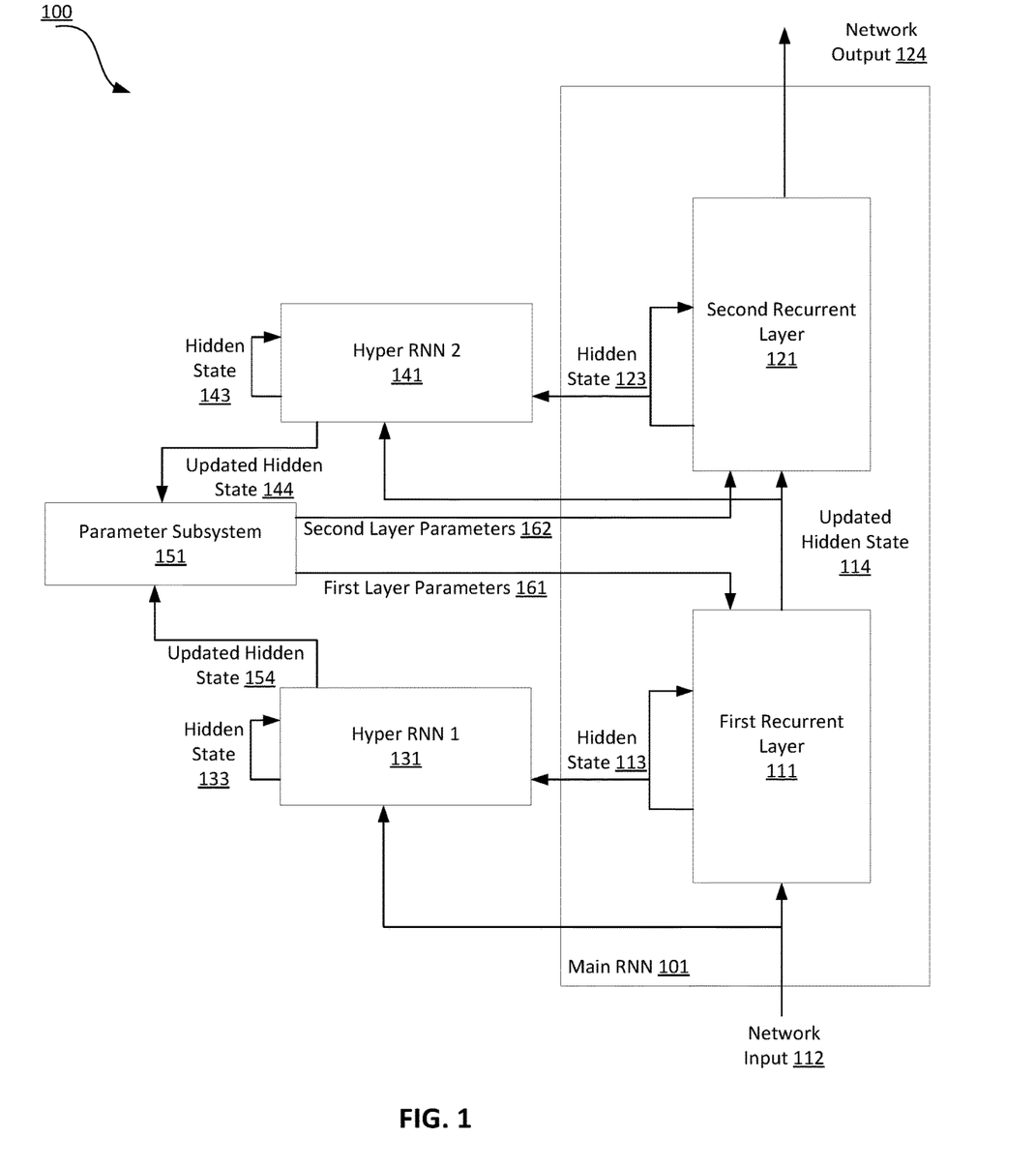
FIG. 1 illustrates a recurrent neural network (RNN) system.

FIG. 1 illustrates a recurrent neural network (RNN) system 100. The RNN system 100 is an example of a system implemented as computer programs on one or more computers in one or more locations, in which the systems, components, and techniques described below can be implemented.

The RNN system 100 is configured to, at each of multiple time steps, receive a network input 112 for the time step and process the network input 112 to generate a network output 124 for the time step.

The RNN system 100 includes a main RNN 101 that includes one or more recurrent layers, e.g., first recurrent layer 111 and second recurrent layer 121. In addition to the recurrent layers, the main RNN 101 can optionally include one or more other types of layers, e.g., output layers, batch normalization layers, and so on.

The RNN system 100 also includes a respective hyper RNN for some or all of the layers of the main RNN 101, e.g., first hyper RNN 131 for the first recurrent layer 111 and second hyper RNN 141 for the second recurrent layer 121. The RNN system 100 also includes a parameter subsystem 151.

Examples of RNN layers include traditional RNN layers and long-short term memory (LSTM) layers. A traditional RNN layer .... An LSTM layer includes one or more LSTM memory blocks. Each LSTM memory block can in turn include one or more cells that each include an input gate, a forget gate, and an output gate that allow the cell to store previous states for the cell, e.g., for use in generating a current activation or to be provided to other components of the LSTM neural network. Example LSTM layers are described in Alex Graves, *Generating Sequences with Recurrent Neural Networks*, at https://arxiv.org/pdf/1308.0850.pdf.

For example, the first recurrent layer 111 is configured to, at each time step, receive as inputs the network input 112 and a layer hidden state 113 and process the inputs in accordance with a set of parameters 161 to generate an updated hidden state 114 for the first recurrent layer 111. The second recurrent layer 121 is configured to, at each time step, receive as inputs the updated hidden state 114 of the first recurrent layer 111 and a layer hidden state 123 and process the inputs to generate an updated hidden state for the second recurrent layer 121. Because the second recurrent layer 121 is the last layer of the main RNN 101, the RNN system 100 can use the updated hidden state for the second recurrent layer 121 to generate the network output 124 for each time step. For instance, the RNN system 100 can include an output layer that applies a softmax activation function on the updated hidden state of the second recurrent layer 121 for a time step to generate the network output 124 for the time step.

The parameters of a recurrent layer are values that the recurrent layer uses to transform its inputs. For example, a recurrent layer may multiply input value vectors by weight matrices and add bias vectors to the product to generate an activation vector. The recurrent layer may subsequently apply one or more non-linear transformations on the activation vector values to generate an updated hidden state vector for a time step.

Each hyper RNN is an RNN of one or more RNN layers that, for each time step, receives as inputs a layer input for a corresponding recurrent layer and a hidden state for the hyper RNN and processes the inputs to generate an updated hidden state for the time step. At each time step, the parameter subsystem 151 uses the updated hidden state for each hyper RNN to generate parameters for the recurrent layer that corresponds to the hyper RNN, e.g., first layer parameters 161 for the first recurrent layer 111 and second layer parameters 162 for the second recurrent layer 121.

Therefore, the parameter subsystem 151 uses the updated hidden states of hyper RNNs for each time step to generate parameter values for recurrent layers that vary across multiple time steps. Each hyper RNN uses, at each time step, the layer input for a corresponding recurrent layer at the time step as an input to generate an updated hidden state for the time step. Therefore, when the parameter subsystem 151 generates parameters for a recurrent layer, those parameters are different for each time step based on the layer input to the recurrent layer for the time step. This is in contrast to conventional RNN systems that share the same parameter values across multiple time steps. This is also in contrast to solutions that relax parameter sharing across multiple time steps during training but fix parameter values for each time step after training. By reducing such parameter sharing across time steps, the RNN system 101 can be more accurately trained and can generate network outputs 124 that are more accurate.

Generating parameter values for recurrent layers using the hyper RNNs and the parameter subsystem 151 is described in greater detail below with reference to FIGS. 2A-2B and 3A-3D.

When a recurrent layer in the main RNN 101 receives parameters for a time step from the parameter subsystem 151, the recurrent layer can use the parameters to process inputs for a time step, i.e., the layer inputs for the time step and the hidden states for the time step, and generate activation values for the time step. The recurrent layer can apply non-linear transformations on the activation values to generate the updated hidden state for the time step.

The RNN system 101 can be trained using conventional methods used for training RNN systems, such as a gradient descent algorithm with backpropagation through time steps that is appropriately adjusted to accommodate vanishing gradient problems. In some implementations, the RNN system 101 may be trained end-to-end, while in other implementations different sets of components of the RNN system 101 will be trained separately from other sets. In particular, during a particular iteration of the training technique, both the main and hyper RNN parameters are updated simultaneously using traditional backpropagation.

Figure 2A:
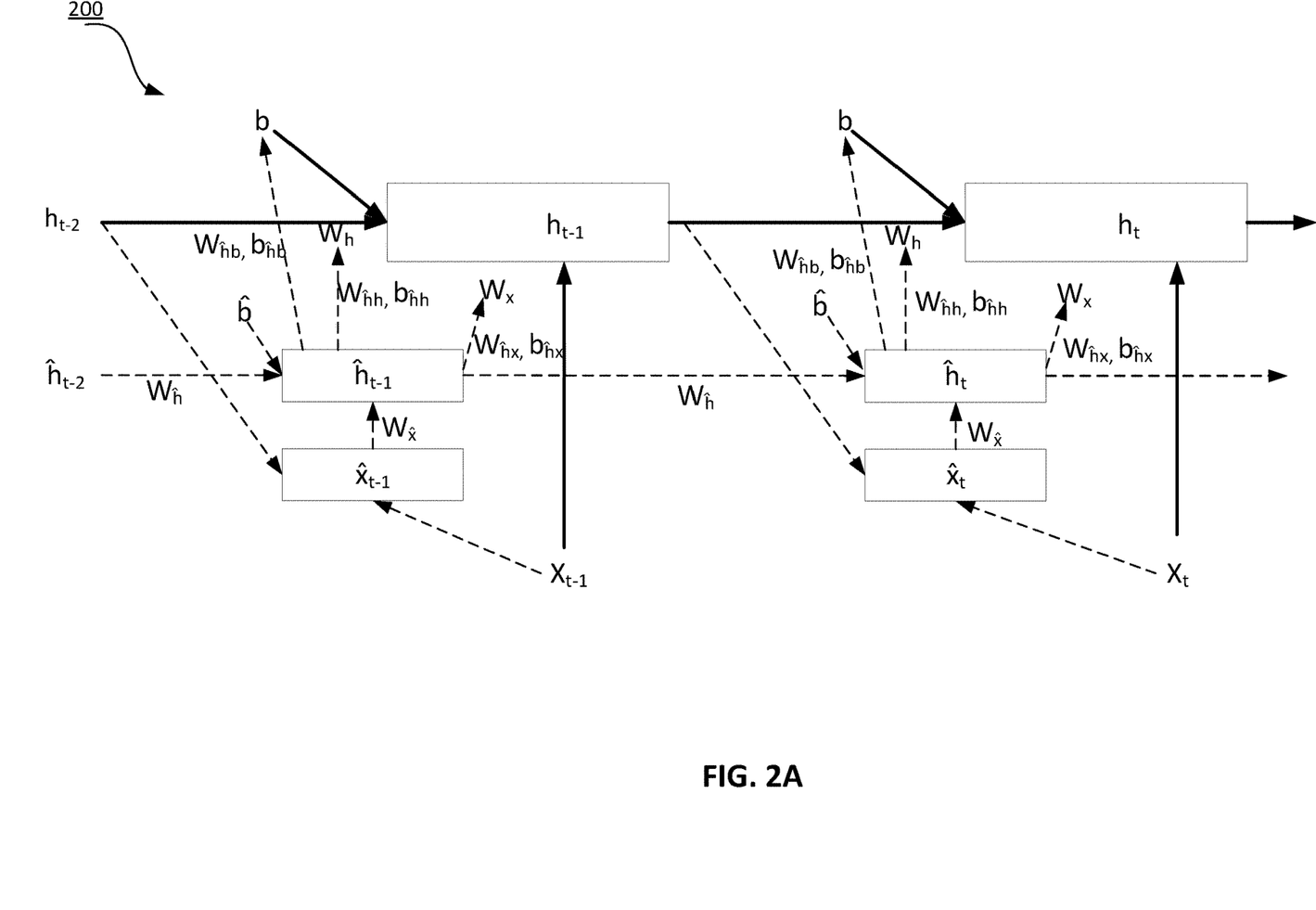
FIG. 2A is a data-flow diagram of a process for generating parameter values for a traditional RNN layer across two time steps.

FIG. 2A is a data-flow diagram of a process 200 for generating parameter values for a traditional RNN layer across two time steps. The operations illustrated in FIG. 2A can be performed by an RNN system, e.g., the RNN system 100 of FIG. 1.

At each time step, the operations performed by a hyper RNN corresponding to the traditional RNN layer and a parameter subsystem, e.g., parameter subsystem 151 of FIG. 1, are illustrated with dashed lines, while operations performed by the traditional RNN layer are illustrated with solid lines.

For convenience, the operations performed in FIG. 2A will now be described with reference to time step t. At time step t, the traditional RNN layer receives a layer input for the time step, i.e., $x_t$, and a hidden state for the traditional RNN layer that can be the updated hidden state for a previous time step, i.e., $h_{t-1}$. The traditional RNN layer evaluates $x_t$ in accordance with a weight matrix $W_x$, evaluates $h_{t-1}$ in accordance with a weight matrix $W_h$, and applies a bias vector b to generate an activation vector. The traditional RNN layer uses the activation vector to generate an updated hidden state vector for the time step, i.e., $h_t$. The values of weight matrices and bias vectors are determined for each time step using the hyper RNN.

The hyper RNN receives $x_t$ and $h_{t-1}$. The hyper RNN combines, e.g., concatenates, those two inputs to generate a hyper RNN input for the time step, i.e., $\hat{x}_t$.

The hyper RNN then receives a hidden state for the hyper RNN for the time step which is the updated hidden state for the hyper RNN for a previous time step, i.e., $\hat{h}_{t-1}$. The hyper RNN then processes $\hat{x}_t$ in accordance with weight matrix $W_{\hat{x}}$, processes $\hat{h}_{t-1}$ in accordance with weight matrix $W_{\hat{h}}$, and applies a bias vector $\hat{b}$ to generate an updated hidden state vector for the hyper RNN for the time step.

The parameter subsystem uses the updated hidden state for the hyper RNN for the time step to generate $W_x$, $W_h$, and b for the time step. Generating such parameter values based on the updated hidden state for the hyper RNN is described in greater detail below with reference to FIGS. 3A-3B.

Figure 2B:
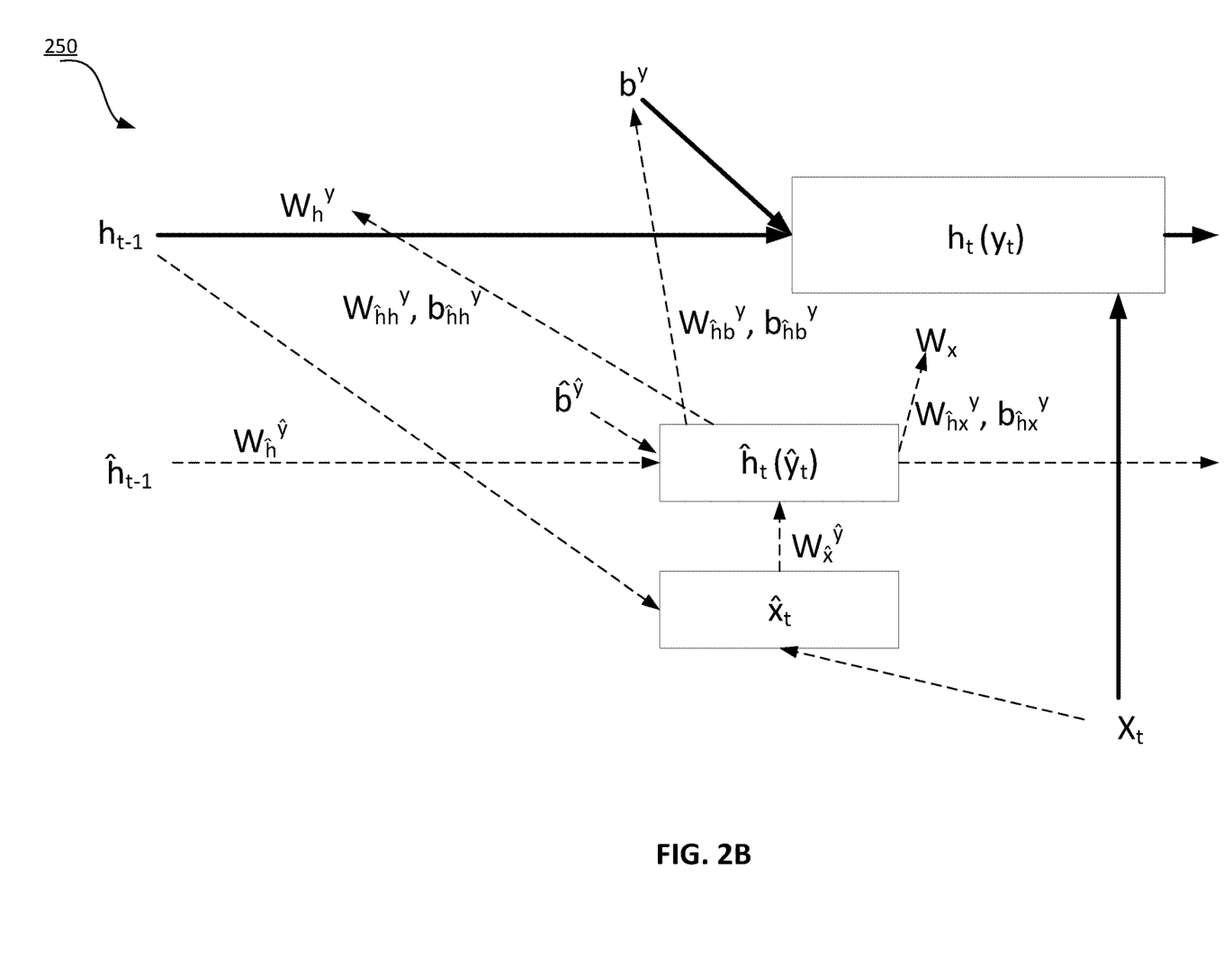
FIG. 2B is a data-flow diagram of a process for generating parameter values for a long-short term (LSTM) layer across one-time step.

FIG. 2B is a data-flow diagram of a process 250 for generating parameter values for a long-short term memory (LSTM) layer across one-time step. The operations illustrated in FIG. 2B can be performed by an RNN system, e.g., the RNN system 100 of FIG. 1.

At each time step, the operations performed by a hyper RNN corresponding to the LSTM layer and a parameter subsystem, e.g., parameter subsystem 151 of FIG. 1, are illustrated with dashed lines, while operations performed by the LSTM layer are illustrated with solid lines.

An LSTM layer can have separate parameter values that the layer uses to evaluate inputs to the layer to generate the values of each of the gates of the LSTM layer. For instance, in an LSTM layer that has a forget gate denoted by f an input gate denoted by i, an output gate denoted by o, and a fourth gate denoted by g, the LSTM layer evaluates the layer input for a time step in accordance with weight matrices $W_x^f$, $W_x^i$, $W_x^o$, and $W_x^g$; the hidden state for the time step in accordance with weight matrices $W_h^f$, $W_h^i$, $W_h^o$, and $W_h^g$; and applies bias vectors $b^f$, $b^i$, $b^o$, $b^g$ to generate activation vectors for gates. In the illustration depicted FIG. 2B, the notation y is used to denote any one gate of the LSTM layer. The operations depicted in FIG. 2B are repeated for each gate of the LSTM layer.

The LSTM layer uses inputs for each time steps and the parameter values to generate a value for each gate of the LSTM layer. The LSTM layer uses the values for LSTM gates to generate the updated hidden state for the LSTM layer for the time step, $h_t$, for instance in accordance with the following two equations:

$$e_t = \sigma(f_t) \odot e_{t-1} + \sigma(i_t) \odot \phi(g_t)$$

$$h_t = \sigma(o_t) \odot \phi(c_t),$$

where $\sigma$ is a sigmoid function, $\phi$ is a hyperbolic tangent function, and $\odot$ is an element-wise multiplication operation. The parameter values for the LSTM layer for each time step are generated by the hyper RNN for the LSTM layer.

The hyper RNN for the LSTM layer can be an RNN with one or more layers, where each of the layers is an RNN layer with any architecture. In the illustration depicted in FIG. 2B, the hyper RNN is a hyper LSTM that includes one LSTM layer with multiple gates. The notation $\hat{y}$ is used to denote any gate of the hyper LSTM.

The hyper LSTM receives $x_t$ and $h_{t-1}$. The hyper LSTM processes those two inputs to generate $\hat{x}_t$, e.g., in accordance with the equation for generating $\hat{x}_t$ described above with reference to FIG. 2A.

The hyper LSTM also receives $\hat{h}_{t-1}$ and processes $\hat{x}_t$ and $\hat{h}_{t-1}$ in accordance with gate-specific parameter values to generate activation values for the values of the gates of the hyper LSTM. In some implementations, the hyper LSTM uses the activation values as the values for gates of the hyper LSTM for the time step. In other implementations, the hyper LSTM applies a layer normalization function to the activation values to generate the values for gates of the hyper LSTM for the time step.

The hyper LSTM uses the final value of its gates to generate the updated hidden state for the hyper LSTM. In some implementations, the hyper LSTM performs the operations of the following equations to generate final values of its gates and the updated hidden state for the time steps:

$$\hat{i}_t = LN\left(W_h^{\hat{i}} \hat{h}_{t-1} + W_i^{\hat{i}} \hat{x}_t + \hat{b}^{\hat{i}}\right)$$

$$\hat{g}_t = LN\left(W_h^{\hat{g}} \hat{h}_{t-1} + W_i^{\hat{g}} \hat{x}_t + \hat{b}^{\hat{g}}\right)$$

$$\hat{f}_t = LN\left(W_h^{\hat{f}} \hat{h}_{t-1} + W_i^{\hat{f}} \hat{x}_t + \hat{b}^{\hat{f}}\right)$$

$$\hat{o}_t = LN\left(W_h^{\hat{o}} \hat{h}_{t-1} + W_i^{\hat{o}} \hat{x}_t + \hat{b}^{\hat{o}}\right)$$

$$\hat{e}_t = \sigma(\hat{f}_t) \odot \hat{e}_{t-1} + \sigma(\hat{i}_t) \odot \phi(\hat{g}_t)$$

$$\hat{h}_t = \sigma(\hat{o}_t) \odot \phi(LN(\hat{e}_t))$$

where LN is a layer normalization function, $\sigma$ is a sigmoid function, $\phi$ is a hyperbolic tangent function, and $\odot$ is an elementwise matrix multiplication operation. Examples of layer normalization functions are described in Ba et al., *Layer Normalization*, available at https://www.cs.toronto.edu/~hinton/absps/LayerNormalization.pdf; and Cooijmans et al., *Recurrent Batch Normalization*, available at https://arxiv.org/pdf/1603.09025.pdf.

The parameter subsystem uses the updated hidden state of the hyper LSTM to generate parameter values denoted by $W_x^y$, $W_h^y$, and $b^y$). Generating such parameter values based on the updated hidden state for the hyper LSTM is described in greater detail below with reference to FIGS. 3C-3D.

Figure 3A:
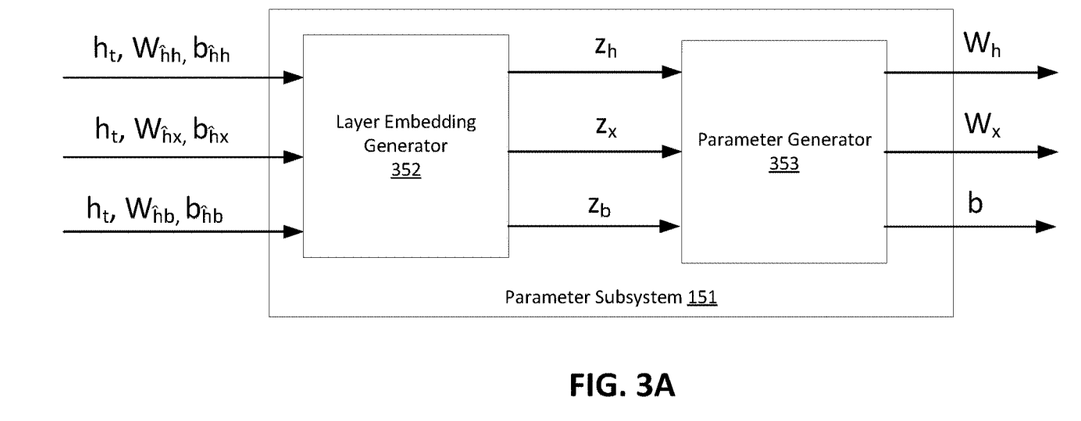
FIGS. 3A-3B illustrate how a parameter subsystem processes the updated hidden state of a hyper RNN to generate parameter values for a traditional RNN layer.
Figure 3B:
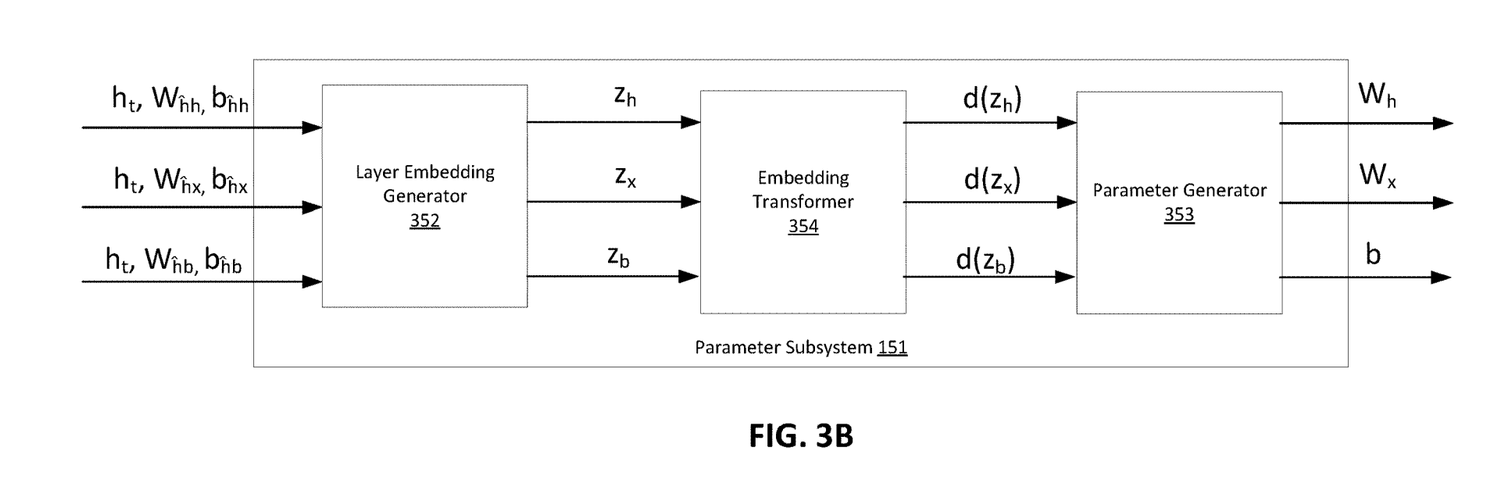

FIGS. 3A-3B illustrate how a parameter subsystem 151 processes the updated hidden state of a hyper RNN to generate parameter values for a traditional RNN layer.

The parameter subsystem 151 processes, using a layer embedding generator 352, the updated hidden state of the hyper RNN, i.e., $h_t$, in accordance with a set of parameter values to generate a set of layer embeddings for the time step.

In the implementations described in FIGS. 3A and 3B, the layer embedding generator 352 generates a layer embedding for each group of the layer parameters for the traditional RNN layer, i.e., a layer embedding $z_x$ for weight values applied to the layer input of the traditional RNN layer for each time step, a layer embedding $z_h$ for weight values applied to the hidden state of the traditional RNN layer for each time step, and a layer embedding $z_b$ for bias values for each time step. The layer embedding generator 352 generates layer embeddings $z_x$, $z_h$, and $z_b$ based on applying parameter values, i.e., weight values and bias values, to $h_t$.

The parameter subsystem 151 processes the layer embeddings to generate parameter values for a time step.

In the implementations depicted in FIG. 3A, a parameter generator 353 of the parameter subsystem 151 processes the layer embeddings in accordance with a set of embedding parameter values to generate parameter values for the traditional RNN layer. The embedding parameter values indicate how a layer embedding should be transformed to generate the parameter values corresponding to the layer embedding.

In the implementations depicted in FIG. 3B, an embedding transformer 354 of the parameter subsystem 151 generates a linear projection of each layer embedding denoted as $d(z_i)$ for a layer embedding i. The parameter generator 353 receives the linear projections and processes the projections with the layer embeddings in accordance with the following equations to generate parameter values for the traditional RNN layer:

$$h_t = \phi(d_h(z_h) \odot W_h h_{t-1} + d_x(z_x) \odot W_x x_t + b(z_h)), \text{ where}$$

$$d_h(z_h) = W_{hz} z_h$$
$$d_z(z_x) = W_{xz} z_x$$
$$b(z_b) = W_{bz} z_b + b_0$$

Figure 3C:
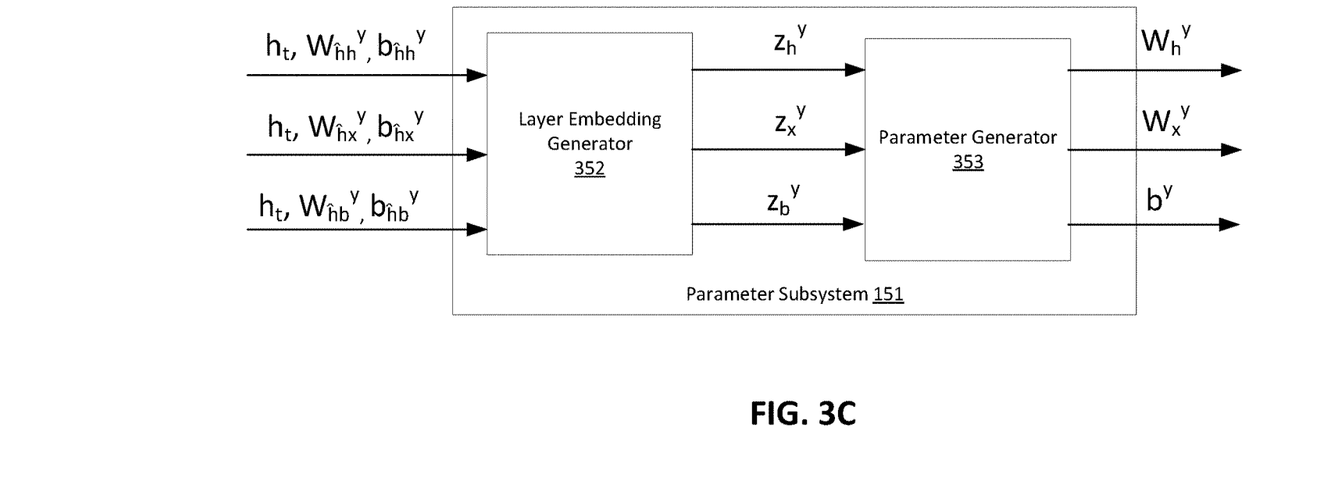
FIGS. 3C-3D illustrate how a parameter subsystem processes the updated hidden state of a hyper RNN to generate parameter values for an LSTM layer.
Figure 3D:
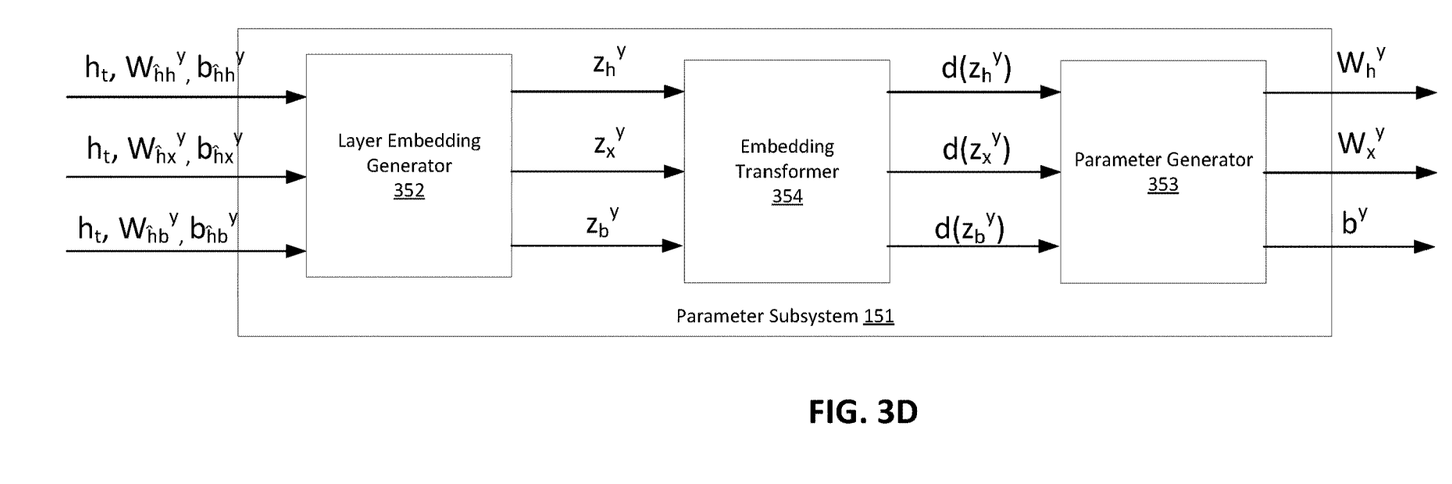

FIGS. 3C-3D illustrate how a parameter subsystem 151 processes the updated hidden state of a hyper RNN to generate parameter values for an LSTM layer.

In the implementations depicted in FIGS. 3C and 3D, the layer embedding generator 352 generates a layer embedding for each group of layer parameters that relate to each gate of the multiple gates of the LSTM layers. The parameter subsystem 151 processes the layer embeddings to generate parameter values for a time step.

In the implementations described in FIG. 3C, the parameter generator 353 processes the layer embeddings in accordance with a set of embedding parameter values to generate the parameter values for the LSTM layer.

In the implementations described in FIG. 3D, the embedding transformer 354 generates a linear projection of each layer embedding and the parameter generator 353 generates each set of parameter values based on the layer embeddings and the linear projections, for example based on the following equations:

$$y_t = LN(d_h^y \odot W_h^y h_{t-1} = d_x^y \odot W_x^y x_t + b^y(z_b^y)), \text{ where}$$

$$d_h^y(z_h) = W_{hx}^y z_h$$
$$d_x^y(z_x) = W_{xz}^y z_x$$
$$b^y(z_b^y) = W_{bz}^y z_b^y + b_0^y$$

Figure 4:
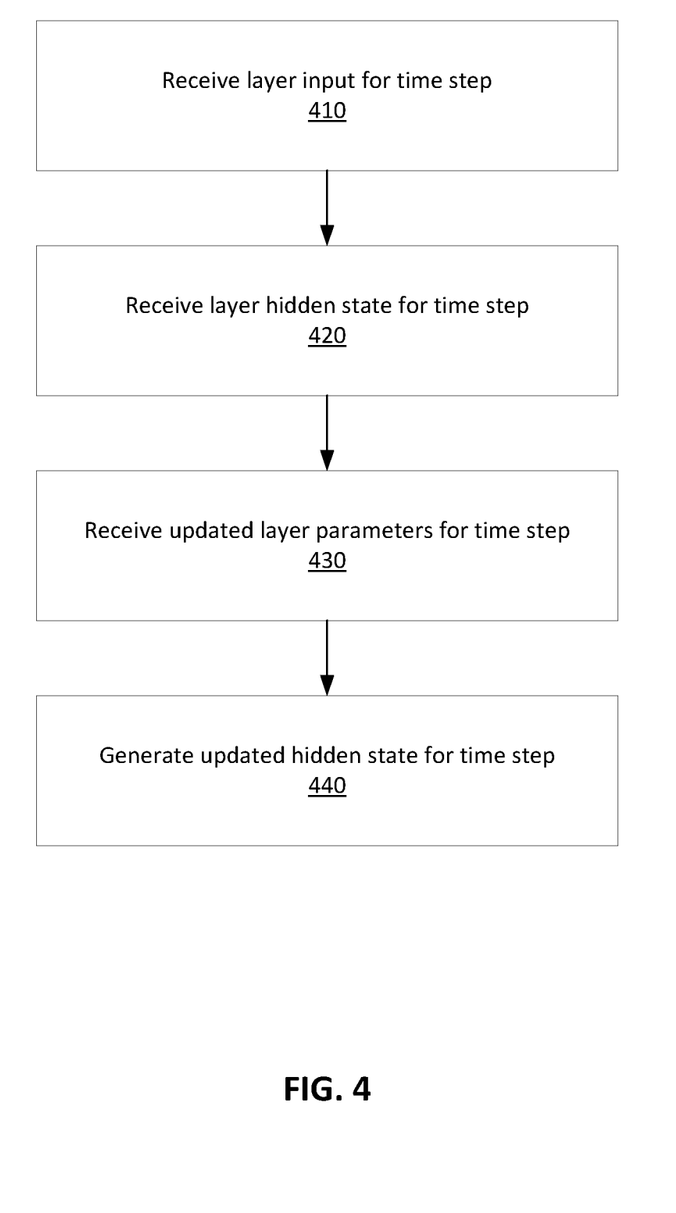
FIG. 4 is a flow-chart of an example process of generating an updated hidden state of a recurrent layer for a time step.

FIG. 4 is a flow-chart of an example process of generating an updated hidden state of a recurrent layer for a time step. The process can be performed by a system of one or more computers, e.g., the RNN system 100 of FIG. 1.

The system receives a layer input for the recurrent layer for the time step (410) and a layer hidden state for the recurrent layer for the time step (420). The system receives updated values for layer parameters of the recurrent layer for the time step from a hyper RNN (430). Generating layer parameters for a time step using a hyper RNN is described in greater detail below with reference to FIG. 5.

The system processes the layer input and the layer hidden state for the time step using the recurrent layer in accordance with the updated layer parameters for the time step to generate the updated hidden state for the recurrent layer for the time step (44).

Figure 5:
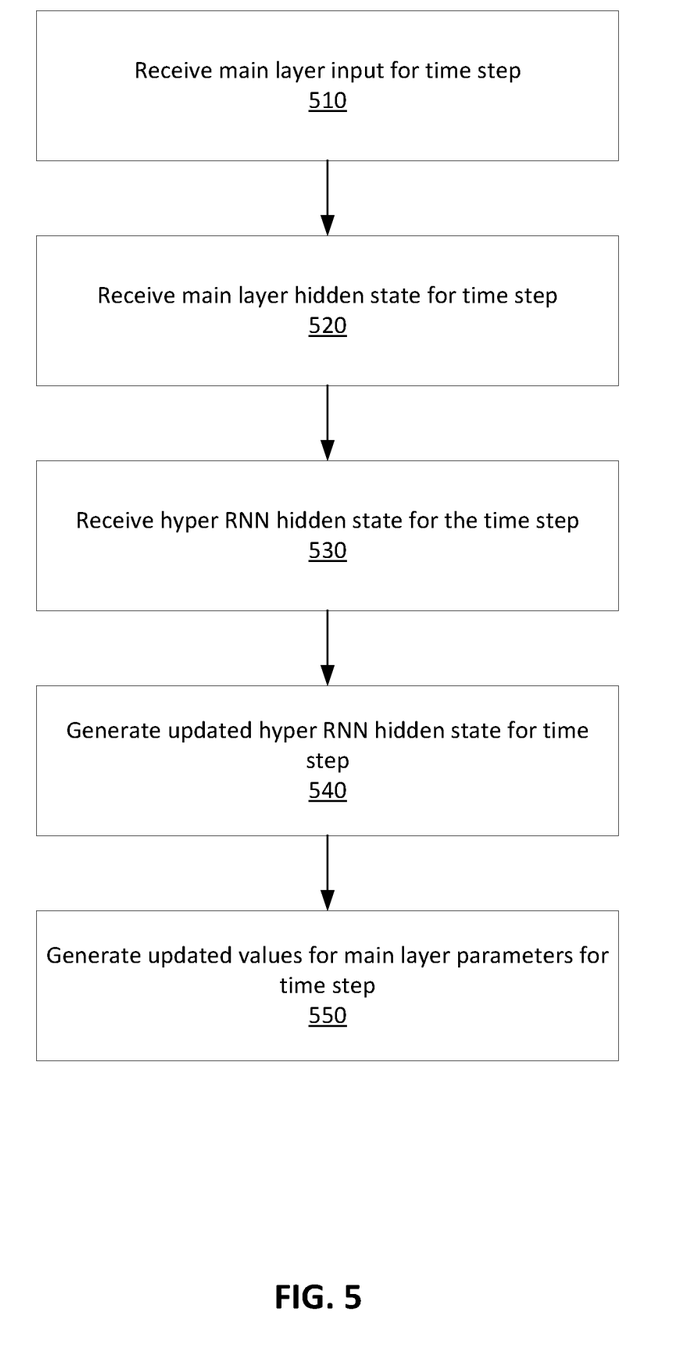
FIG. 5 is a flow-chart of an example process of generating updated values of parameters of a recurrent layer for a time step using a hyper RNN.

FIG. 5 is a flow-chart of an example process of generating updated values of parameters of a recurrent layer for a time step using a hyper RNN. The process can be performed by a system of one or more computers, e.g., the RNN system 100 of FIG. 1.

The system receives the layer input for the recurrent layer for the time step (510) and the hidden state for the recurrent layer for the time step (520). The system receives the hyper RNN hidden state for the time step (530).

The system processes, using the hyper RNN, the layer input for the recurrent layer, the hidden state for the recurrent layer, and the hidden state for the hyper RNN to generate an updated hidden state for the RNN for the time step (540)

The system generates updated values for parameters of the recurrent layer for the time step by processing the updated hidden state for the hyper RNN (550).

In some implementations, the system processes the updated hidden state for the RNN for the time step to generate layer embeddings for the time step and generates the updated layer parameter values for the time step based on the layer embeddings, as described in greater detail above with reference to FIGS. 3A-3D.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to implement:
   a main recurrent neural network, the main neural network being configured to, at each of a plurality of time steps, process a network input at the time step to generate a network output for the time step, the main recurrent neural network comprising:

one or more recurrent neural network layers, wherein each of the one or more recurrent neural network layers is configured to, at each time step, process a layer input and a current layer hidden state in accordance with a set of layer parameters to generate an updated layer hidden state;

a respective hyper recurrent neural network corresponding to each of the one or more recurrent neural network layers, wherein each hyper recurrent neural network is configured to, at each of the plurality of time steps:

generate a current hypernetwork input by combining: (1) the layer input at the time step to the corresponding recurrent neural network layer, (2) the current layer hidden state of the corresponding recurrent neural network layer, and (3) a current hypernetwork hidden state of the hyper recurrent neural network; and process the current hypernetwork input to generate an updated hypernetwork hidden state; and a subsystem that is configured to perform operations comprising, at each of the plurality of time steps and for each of the one or more recurrent neural network layers:

determining, from the updated hypernetwork hidden state for the corresponding hyper recurrent neural network, updated values for the set of layer parameters for the recurrent neural network layer; and updating, for use in processing the layer input for the time step and the current layer hidden state to generate the updated layer hidden state for the time step, the values of the set of layer parameters of the recurrent neural network layer to the updated values.

2. The system of claim 1, wherein determining the updated values for the set of layer parameters for the corresponding recurrent neural network layers comprises:

computing a set of layer embeddings for the corresponding recurrent neural network layer from the corresponding updated hypernetwork hidden state for the corresponding hyper recurrent neural network; and determining the updated values for the set of layer parameters for the corresponding recurrent neural network layer based on the set of layer embeddings.

3. The system of claim 2, wherein determining the updated values for the set of layer parameters for the corresponding recurrent neural network layer based on the set of layer embeddings comprises:

generating a transformed layer embedding for each layer embedding of the set of layer embeddings, each transformed layer embedding being a linear projection of the respective layer embedding; and determining the updated values for the set of layer parameters for the corresponding recurrent neural network layer based on each transformed layer embedding.

4. The system of claim 2, wherein:

each layer embedding of the set of layer embeddings is associated with a respective group of the set of layer parameters for the corresponding recurrent neural network layer; and determining the updated values for the set of layer parameters for the corresponding recurrent neural network layer based on the set of layer embeddings comprises determining layer parameters in each group of the set of layer parameters based on the corresponding layer embedding of the set of layer embeddings.

5. The system of claim 4, wherein the groups of the set of layer parameters for the corresponding recurrent neural network layer comprises:

a first group of the set of layer parameters that include parameter values applied to the layer input of the corresponding recurrent neural network in generating the updated hidden state of the corresponding recurrent neural network;

a second group of the set of layer parameters that include parameter values applied to the hidden state of the corresponding recurrent neural network in determining the updated hidden state of the corresponding recurrent neural network; and a third group of the set of layer parameters that include bias values.

6. The system of claim 2, wherein:

the one or more recurrent neural network layers comprise one or more long short term memory (LSTM) layers, each LSTM layer of the one or more LSTM layers being associated with a plurality of gates; and each layer embedding of the set of layer embeddings for each LSTM neural network layer is associated with a gate of the plurality of gates of the respective LSTM neural network layer and a respective group of the set of layer parameters for the respective LSTM layer.

7. The system of claim 6, wherein:

determining the updated values for set of layer parameters for each respective LSTM layer comprises determining layer parameters associated with a respective gate and a respective group of the set of layer parameters based on the respective layer embedding associated with the respective gate and the respective group of the set of layer parameters.

8. The system of claim 6, wherein generating, by the subsystem for a time step of the plurality of time steps, the updated layer hidden state for the time step comprises:

for each respective gate of each LSTM layer, processing the layer input to the respective LSTM neural network layer in accordance with a first group of the set of parameters associated with the respective gate that include parameter values applied to the layer input of the respective LSTM layer to update the respective gate of the respective LSTM neural network layer;

processing the hidden state to the respective LSTM neural network layer in accordance with a second group of the set of parameters associated with the respective gate that include parameter values applied to the hidden state of the respective LSTM neural network layer to update the respective gate of the respective LSTM neural network layer;

generating an activation value for the respective gate by combining values obtained from processing the layer input and processing the hidden state;

generating a modified activation value for the respective gate by combining the activation value with a third group of the set of parameters associated with the respective gate that include the bias values for the respective gate; and applying a normalization function to the modified activation value for the respective gate to generate the final value of the respective gate for the respective time step.

9. One or more non-transitory computer storage media storing instructions that when executed by one or more computers cause the one or more computers to implement:

a main recurrent neural network, the main neural network being configured to, at each of a plurality of time steps, process a network input at the time step to generate a network output for the time step, the main recurrent neural network comprising:
  one or more recurrent neural network layers, wherein each of the one or more recurrent neural network layers is configured to, at each time step, process a layer input and a current layer hidden state in accordance with a set of layer parameters to generate an updated layer hidden state;
  a respective hyper recurrent neural network corresponding to each of the one or more recurrent neural network layers, wherein each hyper recurrent neural network is configured to, at each of the plurality of time steps:
    generate a current hypernetwork input by combining: (1) the layer input at the time step to the corresponding recurrent neural network layer, (2) the current layer hidden state of the corresponding recurrent neural network layer, and (3) a current hypernetwork hidden state of the hyper recurrent neural network; and
    process the current hypernetwork input to generate an updated hypernetwork hidden state; and
  a subsystem that is configured to perform operations comprising, at each of the plurality of time steps and for each of the one or more recurrent neural network layers:
    determining, from the updated hypernetwork hidden state for the corresponding hyper recurrent neural network, updated values for the set of layer parameters for the recurrent neural network layer; and
    updating, for use in processing the layer input for the time step and the current layer hidden state to generate the updated layer hidden state for the time step, the values of the set of layer parameters of the recurrent neural network layer to the updated values.

10. The computer storage media of claim 9, wherein determining the updated values for the set of layer parameters for the corresponding recurrent neural network layers comprises:
  computing a set of layer embeddings for the corresponding recurrent neural network layer from the corresponding updated hypernetwork hidden state for the corresponding hyper recurrent neural network; and
  determining the updated values for the set of layer parameters for the corresponding recurrent neural network layer based on the set of layer embeddings.

11. The computer storage media of claim 10, wherein determining the updated values for the set of layer parameters for the corresponding recurrent neural network layer based on the set of layer embeddings comprises:
  generating a transformed layer embedding for each layer embedding of the set of layer embeddings, each transformed layer embedding being a linear projection of the respective layer embedding; and
  determining the updated values for the set of layer parameters for the corresponding recurrent neural network layer based on each transformed layer embedding.

12. The computer storage media of claim 10, wherein:
  each layer embedding of the set of layer embeddings is associated with a respective group of the set of layer parameters for the corresponding recurrent neural network layer; and
  determining the updated values for the set of layer parameters for the corresponding recurrent neural network layer based on the set of layer embeddings comprises determining layer parameters in each group of the set of layer parameters based on the corresponding layer embedding of the set of layer embeddings.

13. The computer storage media of claim 12, wherein the groups of the set of layer parameters for the corresponding recurrent neural network layer comprises:
  a first group of the set of layer parameters that include parameter values applied to the layer input of the corresponding recurrent neural network in generating the updated hidden state of the corresponding recurrent neural network;
  a second group of the set of layer parameters that include parameter values applied to the hidden state of the corresponding recurrent neural network in determining the updated hidden state of the corresponding recurrent neural network; and
  a third group of the set of layer parameters that include bias values.

14. The computer storage media of claim 10, wherein:
  the one or more recurrent neural network layers comprise one or more long short term memory (LSTM) layers, each LSTM layer of the one or more LSTM layers being associated with a plurality of gates; and
  each layer embedding of the set of layer embeddings for each LSTM neural network layer is associated with a gate of the plurality of gates of the respective LSTM neural network layer and a respective group of the set of layer parameters for the respective LSTM layer.

15. The computer storage media of claim 14, wherein:
  determining the updated values for set of layer parameters for each respective LSTM layer comprises determining layer parameters associated with a respective gate and a respective group of the set of layer parameters based on the respective layer embedding associated with the respective gate and the respective group of the set of layer parameters.

16. The computer storage media of claim 14, wherein generating, by the subsystem for a time step of the plurality of time steps, the updated layer hidden state for the time step comprises:
  for each respective gate of each LSTM layer,
    processing the layer input to the respective LSTM neural network layer in accordance with a first group of the set of parameters associated with the respective gate that include parameter values applied to the layer input of the respective LSTM layer to update the respective gate of the respective LSTM neural network layer;
    processing the hidden state to the respective LSTM neural network layer in accordance with a second group of the set of parameters associated with the respective gate that include parameter values applied to the hidden state of the respective LSTM neural network layer to update the respective gate of the respective LSTM neural network layer;
    generating an activation value for the respective gate by combining values obtained from processing the layer input and processing the hidden state;
    generating a modified activation value for the respective gate by combining the activation value with a third group of the set of parameters associated with the respective gate that include the bias values for the respective gate; and
    applying a normalization function to the modified activation value for the respective gate to generate the final value of the respective gate for the respective time step.

17. A method of processing a sequence of network inputs having a respective network input at each of a plurality of time steps to generate a sequence of network outputs, the method comprising, for each of the plurality of time steps:
for each of one or more recurrent neural network layers of a main recurrent neural network:
providing a layer input for the recurrent neural network layer at the time step as input to a hyper recurrent neural network corresponding to the recurrent neural network layer, wherein the hyper recurrent neural network is configured to:
generate a current hypernetwork input by combining: (1) the layer input at the time step to the corresponding recurrent neural network layer, (2) the current layer hidden state of the corresponding recurrent neural network layer, and (3) a current hypernetwork hidden state of the hyper recurrent neural network; and
process the current hypernetwork input to generate an updated hypernetwork hidden state;
determining, from the updated hypernetwork hidden state for the corresponding hyper recurrent neural network, updated values for a set of layer parameters for the recurrent neural network layer; and
providing the layer input as input to the recurrent neural network layer, wherein the recurrent neural network layer is configured to process the layer input and a current layer hidden state in accordance with the updated values of the set of layer parameters to generate an updated layer hidden state.

18. The method of claim 17, wherein determining the updated values for the set of layer parameters for the corresponding recurrent neural network layer comprises:
computing a set of layer embeddings for the corresponding recurrent neural network layer from the corresponding updated hypernetwork hidden state for the corresponding hyper recurrent neural network; and
determining the updated values for the set of layer parameters for the corresponding recurrent neural network layer based on the set of layer embeddings.

19. The method of claim 18, wherein determining the updated values for the set of layer parameters for the corresponding recurrent neural network layer based on the set of layer embeddings comprises:
generating a transformed layer embedding for each layer embedding of the set of layer embeddings, each transformed layer embedding being a linear projection of the respective layer embedding; and
determining the updated values for the set of layer parameters for the corresponding recurrent neural network layer based on each transformed layer embedding.

20. The method of claim 18, wherein:
each layer embedding of the set of layer embeddings is associated with a respective group of the set of layer parameters for the corresponding recurrent neural network layer; and
determining the updated values for the set of layer parameters for the corresponding recurrent neural network layer based on the set of layer embeddings comprises determining layer parameters in each group of the set of layer parameters based on the corresponding layer embedding of the set of layer embeddings.

* * * * *